United States Patent [19]

Jones et al.

[11] 4,199,746

[45] Apr. 22, 1980

[54] SIDE LOOKING SONAR APPARATUS

[75] Inventors: Charles H. Jones, Pasadena; George A. Gilmour, Severna Park, both of Md.

[73] Assignee: Westinghouse Electric Corp., Pittsburgh, Pa.

[21] Appl. No.: 897,324

[22] Filed: Apr. 18, 1978

[51] Int. Cl.² .............................................. G01S 9/66
[52] U.S. Cl. ...................................... 367/135; 367/88
[58] Field of Search ................... 340/3 R, 3 C, 3 F, 9

[56] References Cited

U.S. PATENT DOCUMENTS

| 3,716,824 | 2/1973 | Dorr | 340/3 R |
|---|---|---|---|
| 3,881,164 | 4/1975 | Kossoff | 340/9 X |
| 3,950,723 | 4/1976 | Gilmour | 340/3 R |
| 3,967,234 | 6/1976 | Jones | 340/9 X |

Primary Examiner—T. H. Tubbesing
Attorney, Agent, or Firm—D. Schron

[57] ABSTRACT

A side looking sonar system having a transducer made up of a plurality of active transducer element sections lying along a line and wherein the element sections are relatively phased to provide for all range focusing and multiple beam formation. The element sections are longer in the middle of the transducer and reduce in length toward the ends of the transducer. In one case the line is an arc lying in a plane, with the plane having a certain depression angle.

7 Claims, 25 Drawing Figures

SIDE LOOKING SONAR APPARATUS

BACKGROUND OF THE INVENTION

1. Field of the Invention

The invention relates to an improved side looking sonar system.

2. Description of the Prior Art

In side looking sonar systems, a transducer on a carrier vehicle periodically projects pulses of acoustic energy to insonify a target area such as the sea bottom, as the carrier proceeds along a course line. Acoustic energy reflected back from the insonified area, and targets on it, is received by a receiver transducer. The receiver beam associated with the receiver transducer is such that the receiver detects reflected acoustic energy from relatively narrow insonified strips during the course of travel.

The received acoustic energy is processed and displayed on a suitable display apparatus. With each pulse transmission and subsequent reception a scan line is produced on the display to build up a picture of the sea bottom in a manner similar to the scanning of a conventional cathode ray beam in a television picture tube with the presentation being a pattern of highlights and shadows analogous to an optically viewed panorama illuminated by side lighting, with objects outlined in such a way as to permit their identification.

For increased resolutions there has been developed a side looking sonar transducer which is of a curved configuration wherein the transducer segments or elements making up the transducer lie along the arc of a circle whose radius is the design altitude and acoustic energy is focused along a line of focus on the sea bottom. These focused transducers must be used at a precise altitude above the sea bottom since excursions above or below the designed altitude tend to defocus the operation and consequently degrade the display.

A side looking sonar system has been developed which provides for a high resolution operation without the requirement for operating at a single precise altitude. The system, described in U.S. Pat. No. 3,950,723 basically utilizes a multi-element straight line transducer with signal processing channels connected to each segment of the transducer to continuously and electronically vary the focus as a function of time. The effect of this operation is in essence to simulate a transducer with a sharp curvature to focus close in early after a transmitted pulse, then to decrease the curvature with time as the return comes in from longer ranges. The signal processing has the additional capabilities of providing multiple receiver beams so as to increase search rate capabilities.

In matching the straight line transducer array to a curved wave front of an acoustic wave being received, delays or phase shifts are introduced between elements in the signal processing with the greatest phase differential being experienced by the end transducer elements and the design of the transducer array is such that each of the elements is of the same size as the end elements. Since each element output signal is processed, a great deal of signal processing components must be provided. The present invention allows for all range focusing and multiple beam formation, within certain limits, and does so with significantly less signal processing hardware requirements.

SUMMARY OF THE INVENTION

The side looking sonar apparatus of the present invention includes an elongated receiver transducer having an array of adjacent active elements lying along a line. In a preferred embodiment the line is an arc with the arc lying in a plane having a certain depression angle during operation of the apparatus over a target area.

In order to minimize the total number of active elements utilized in the apparatus the elements are designed so that they each experience the same phase differential from one end to the other end of the element in response to, and with respect to, a wave front emanating from a point of minimum range. In this manner active elements nearer the center of the elongated transducer are of much greater length than are elements nearer the ends thereof.

DESCRIPTION OF THE PREFERRED EMBODIMENT

Figure 1:
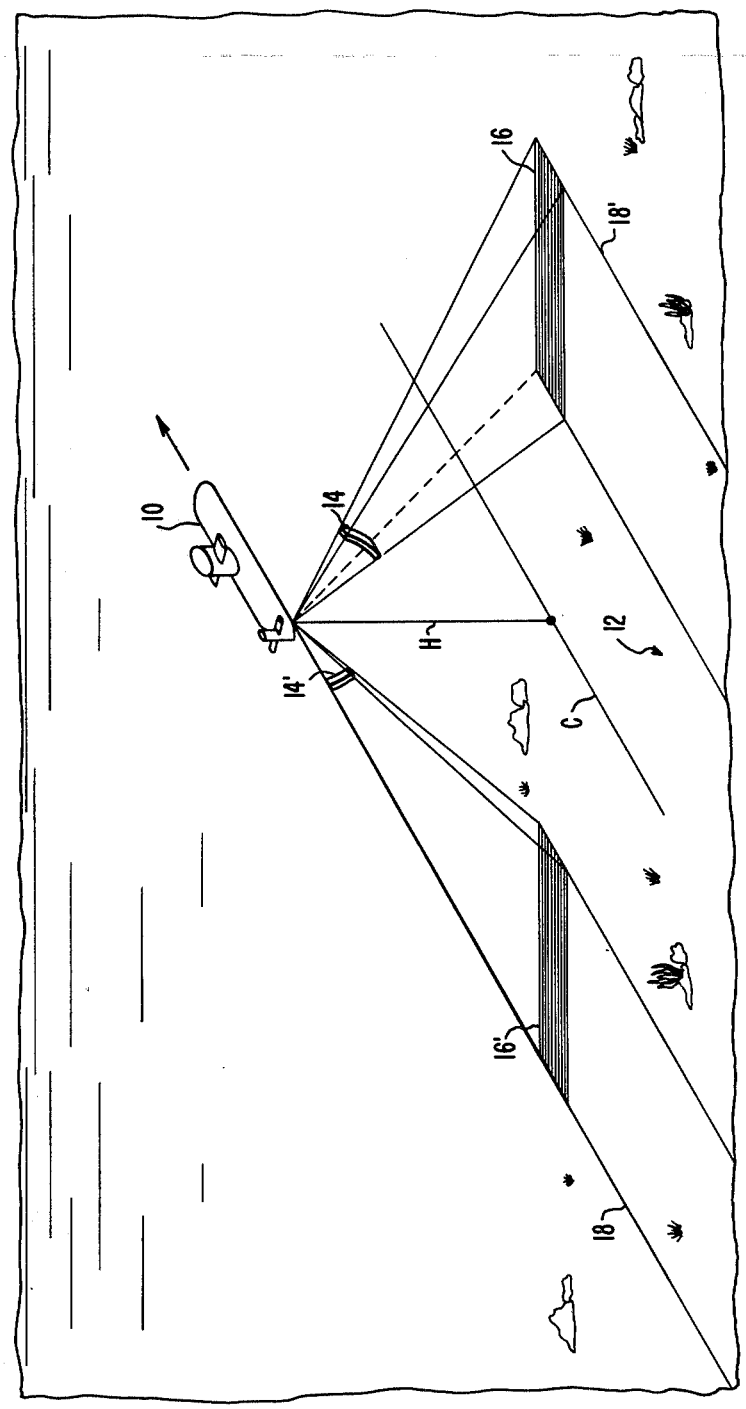
FIG. 1 illustrates a side looking sonar system in operation over a target area.

Referring now to FIG. 1, an underwater carrier vehicle 10 at an altitude H above the bottom 12 proceeds along a course line, the projection of which on the bottom is designated C. Side looking sonar apparatus on the carrier vehicle includes a transmitter transducer which periodically provides pulses 14 and 14' of acoustic energy which insonify areas on the bottom to the starboard and port sides. Reflected energy from these insonified areas is received by receiver transducers and the signals provided thereby are processed such that, for the example illustrated in FIG. 1, multiple receiver beams are formed for looking at multiple elongated adjacent areas 16, 16' on the bottom 12. By way of example 10 simultaneous beams may be formed for looking at 10 adjacent narrow strips.

As the vehicle 10 proceeds along its course line multiple sequential acoustic transmissions take place such that adjacent areas on the bottom are insonified. Areas 16 and 16' represent the current areas being examined while areas 18 and 18' represent the accumulation of previous areas examined.

Figure 2:
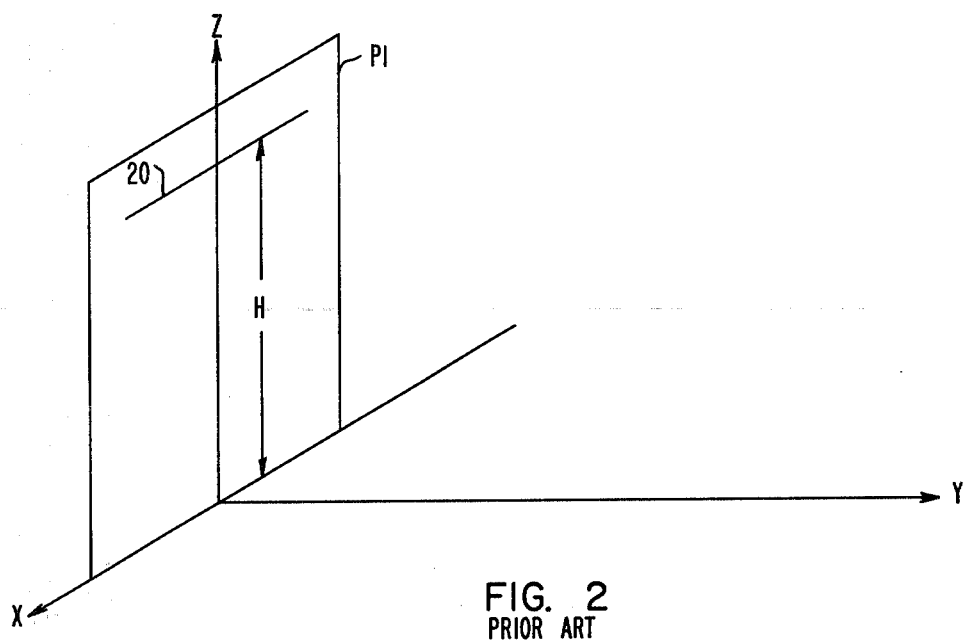
FIG. 2 illustrates, in an XYZ coordinate system, the orientation of a line transducer of the prior art.
Figure 3:
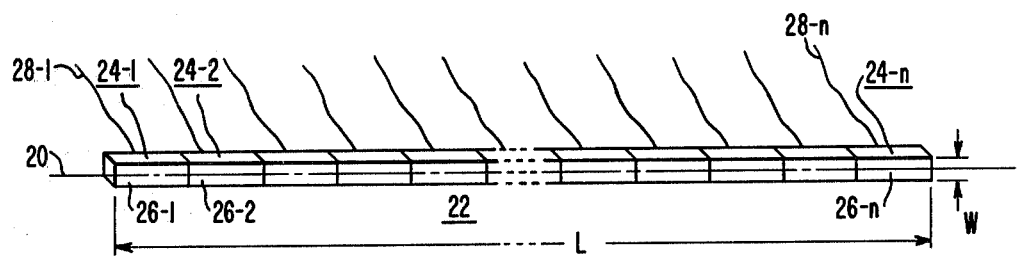
FIG. 3 illustrates a transducer array made up of linearly arranged transducer active elements.

In FIG. 2 there is illustrated an XYZ coordinate system with the XY plane representing the bottom, 12, of FIG. 1. A plane P1 lies in the XZ plane and numeral 20 designates a straight line lying in the plane P1, at an altitude H above the XY plane. The active elements of the receiver transducer lie along this line 20, as illustrated in FIG. 3 to which reference is now made. In the ensuing discussions, a single beam system will initially be assumed for ease of explanation, and accordingly transducer 22 of FIG. 3 can be either a transmitter transducer or receiver transducer. Transducer 22 is made up of a plurality of active transducer elements 24-1, 24-2 . . . 24-n each having a respective active surface 26-1, 26-2, 26-n the centers of which touch line 20. The active surfaces have suitable electrode means which may all be of the same reference potential and other electrode means are positioned on respective opposite surfaces which are connected to respective leads 28-1, 28-2 . . . 28-n. Typically, the length L of transducer 22 is in the order of hundreds of $\lambda$ with the width W of the active face being in the order of $\frac{3}{4}\lambda$, where $\lambda$ is the wavelength in water of the operating frequency.

As a receiver transducer, and in the arrangement of U.S. Pat. No. 3,950,723, each of the transducer segments provides a respective output signal in response to receipt of acoustic energy and these segment output signals are conducted via leads 28-1 to 28-n to suitable signal processing channels.

Figure 4:
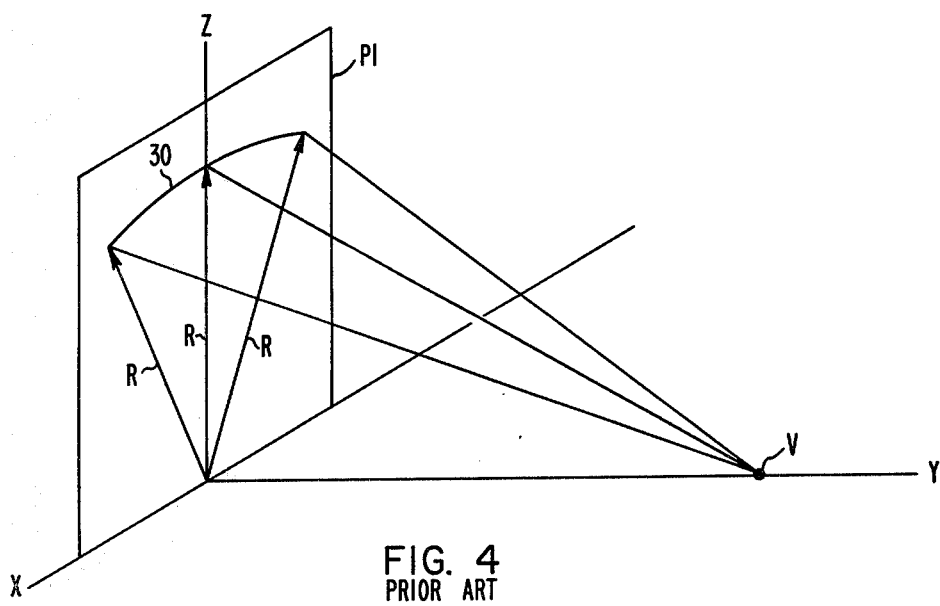
FIG. 4 is similar to FIG. 2, however showing an arc transducer of the prior art.

FIG. 4 illustrates the principles of the focused arc transducer. As in FIG. 2, the XY plane represents the bottom 12 of FIG. 1 and plane P1 lies in the XZ plane. Numeral 30 designates a line in the form of an arc of a circle of radius R having its center at the intersection of the X, Y and Z axes. Acoustic energy from any point V, on the Y axis (referred to as the focal line) will impinge upon all points of line 30 at the same time so that with the transducer active elements positioned with their faces lying along line 30, there will be provided a side looking sonar system which is in focus all along the focal line.

Figure 5:
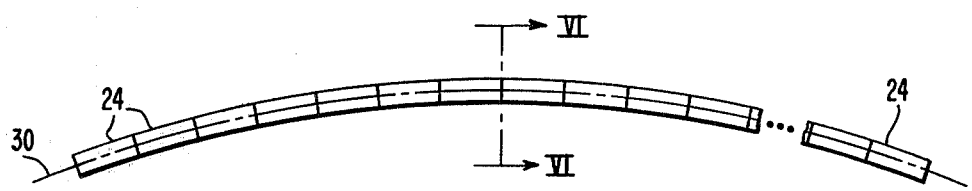
FIG. 5 illustrates the active elements for the arc transducer oriented as in FIG. 4.

FIG. 5 illustrates a plurality of active elements 24 arranged end to end along the line 30.

Figure 6A:
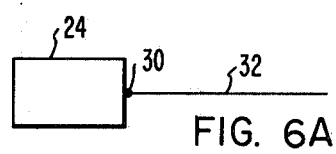
FIG. 6A and FIG. 6B illustrate the concept of depression angle for the transducer active elements.
Figure 6B:
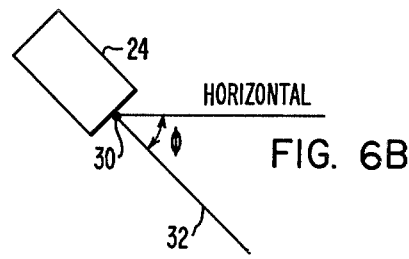

FIG. 6A is a view along line VI—VI of FIG. 5 and illustrates an element 24 having an active face lying along the curved line 30 (enlarged in FIG. 6A for clarity). A line 32 represents the perpendicular to the active face of element 24. As is customarily done, the active elements are given a certain depression angle by rotating each element about the imaginary line 30 to result in an orientation illustrated in FIG. 6B wherein the active element 24 has a depression angle of $\phi$. Such depression angle would also normally be imparted to the active elements of FIG. 3.

Figure 7A:
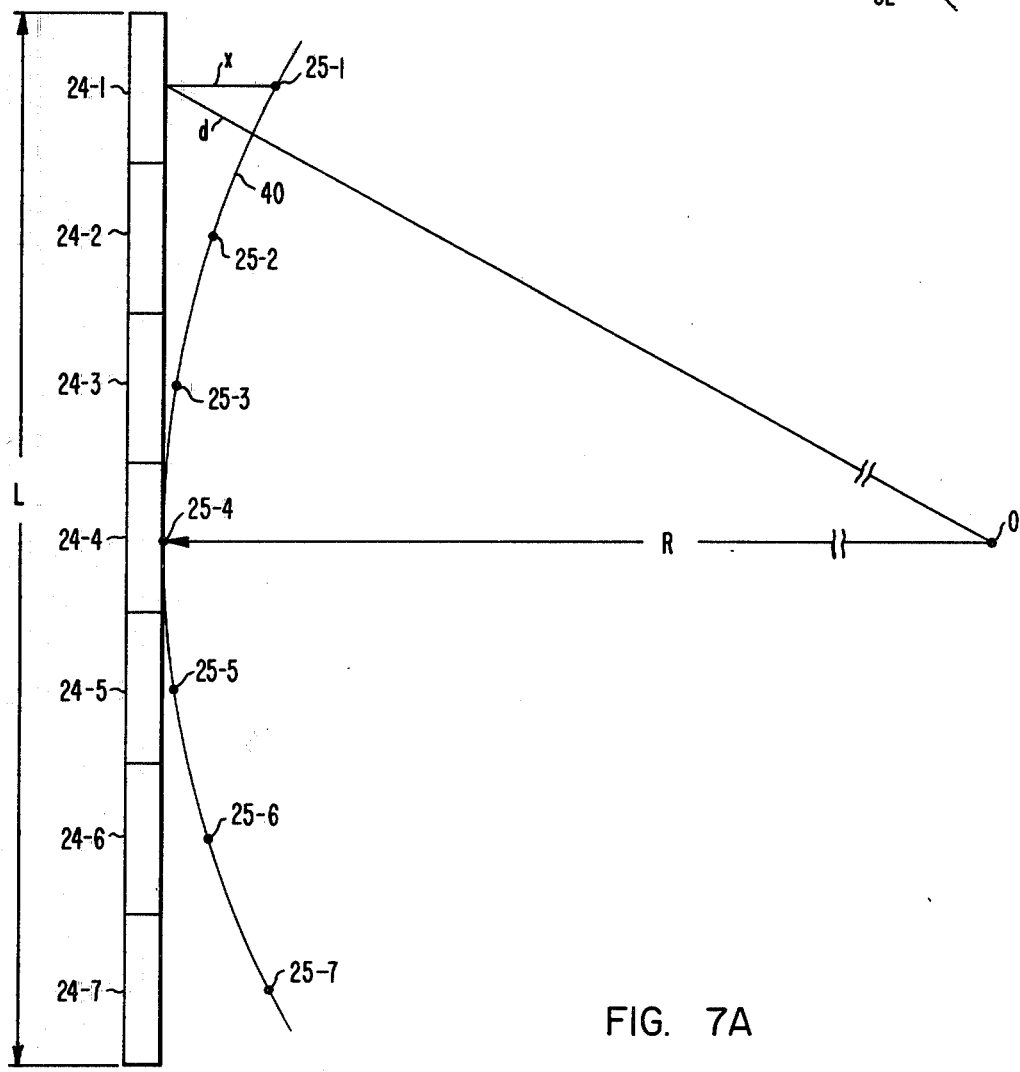
FIG. 7A illustrates a straight line transducer array and its relation to an impinging wave front emanating from a target point.

FIG. 7A illustrates a straight line transducer, as in FIG. 3, having by way of example 7 active elements 24-1 to 24-7. A wave front 40 emanating from a distant point O is seen as just touching the center element 24-4 and is at a radial distance d from the center of end element 24-1. In order to be focused at point O, the signal from element 24-4 will have to be delayed by an amount equivalent to the time required for the wave front to travel the distance d to the center of the end element. Similarly, the outputs from intermediate elements will have to be delayed proportionally. Since the distance from O to the array is very large compared to L, the distance X, which is normal to the element, is very nearly equal to distance d, which is normal to the wave front. Points 25-1 to 25-7 are reference points on wave front 40, and are further illustrated in FIG. 7B.

Figure 7B:
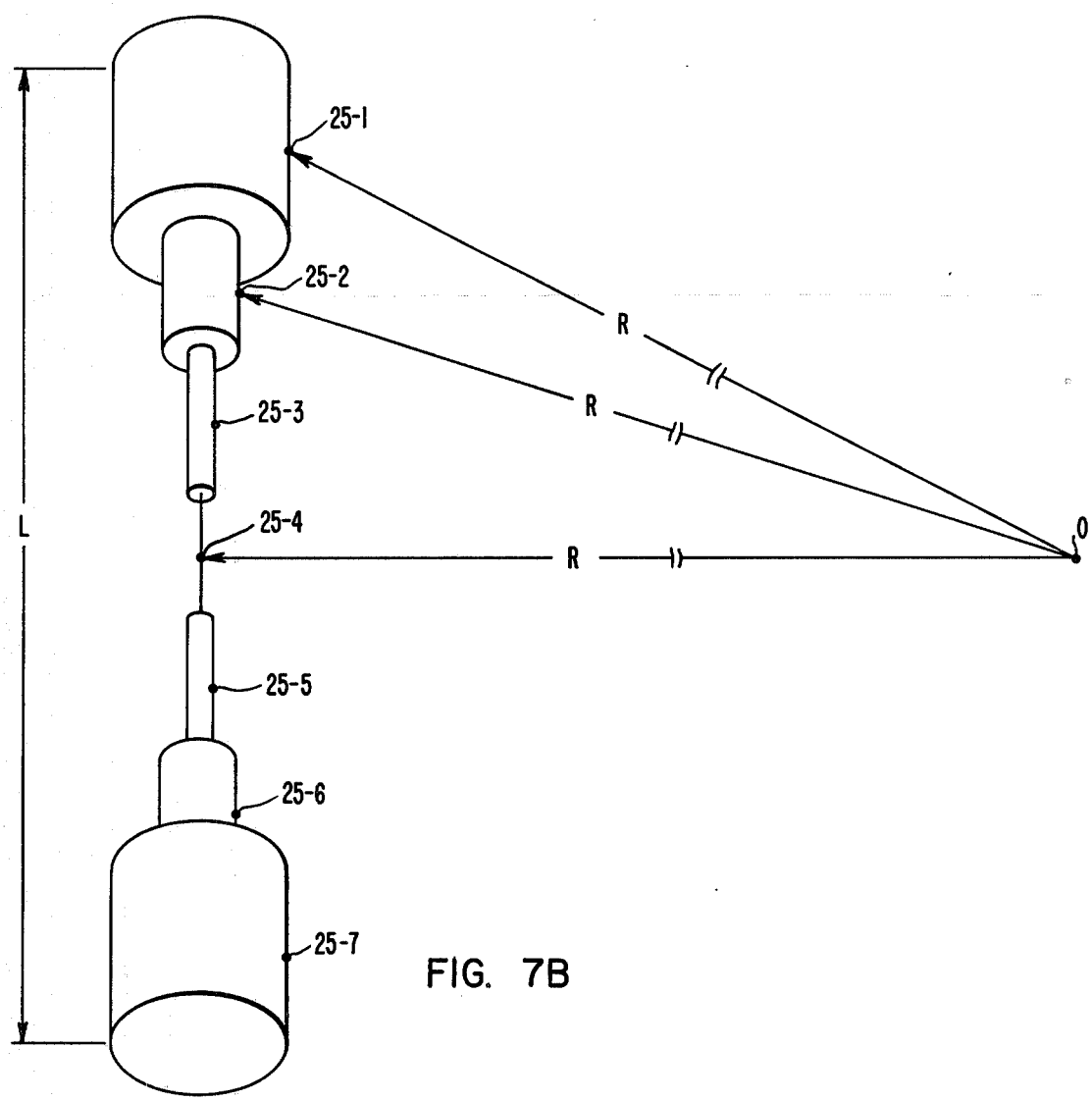
FIG. 7B illustrates a line of cylindrical elements which would focus energy at a range R.

In the operation of the apparatus of U.S. Pat. No. 3,950,723 the phasing of the individual transducer elements is varied so as to provide essentially a phase contour which matches the wave fronts of the incoming reflected acoustic energy from some minimum range out to some maximum range. The straight line array is effectively and electronically formed into a stepped cylinder as shown in FIG. 7B. The points 25-1, 25-2, . . . 25-7 lie on an arc of radius R which varies its curvature as a function of time.

Figure 8:
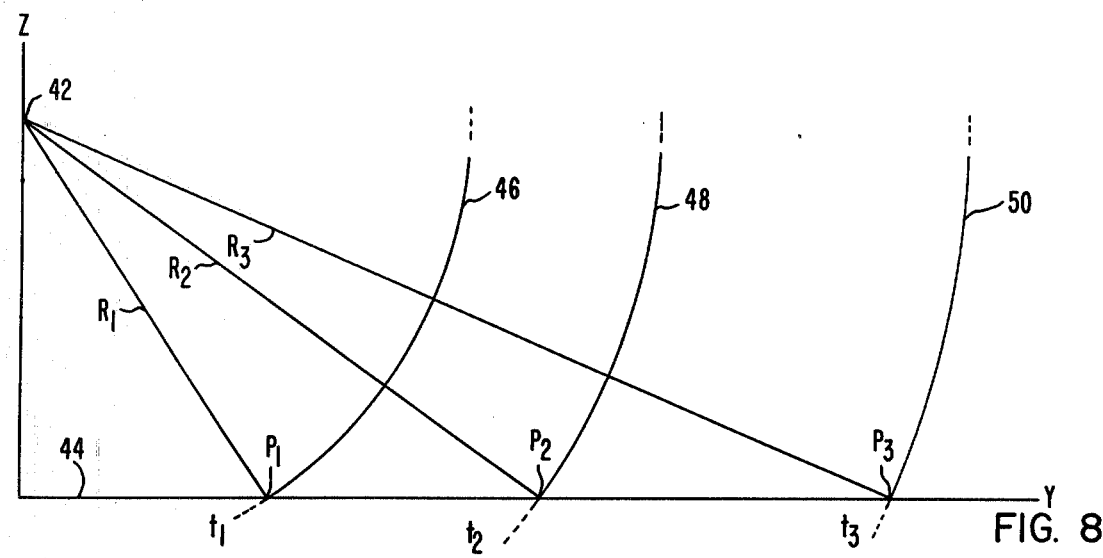
FIG. 8 illustrates the principle of dynamic focusing of transducer apparatus of the prior art.

For example, FIG. 8 illustrates an elevational view looking along the X axis of FIG. 2. The apparatus is positioned at point 42 above the sea bottom 44. Let it be assumed that at some time $t_1$ the output signals from the segments of the transducer are phased in such a manner that the transducer assumes a shape so as to be focused at the range $R_1$. The transducer is not only focused at point $P_1$ on the bottom 44 but will be focused at all points along a vertical circle of radius $R_1$, a portion of which, 46 is illustrated. At time $t_2$ the relative phasing is such as to focus at range $R_2$ encompassing not only point $P_2$ but all points along the vertical circle 48. The process continues and arc 50 illustrates the situation at some later time $t_3$ where the transducer is in focus at range $R_3$, at point $P_3$ and at all points along the circle 50.

The number of transducer segments illustrated in FIG. 7A is shown merely by way of example and in the actual design of the equipment various criteria enter into the number of transducer elements to be utilized. Heretofore, each of the elements of the array were of the same length, that length being equal to the length of the end element which experienced maximum phase differential throughout the operation.

Theoretically, if the transducer could be broken up into an infinite number of elements then it could assume the exact phase contour of the incoming wave fronts. The greater the number of individual active elements, the closer the approximation will be. However, it is to be remembered that each element output signal is provided to a signal processing channel and the more channels that are required, the greater will be the costs of the overall system. Accordingly in the design of the transducer apparatus an element is made of a length long enough so as to reduce the number of elements to be used yet not so long as to degrade satisfactory operation.

Figure 9:
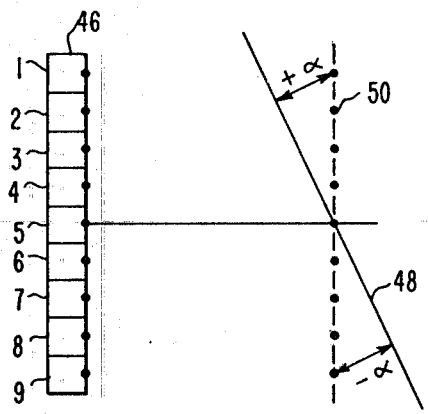
FIG. 9 illustrates a single transducer active element in relation to an impinging wave front.
Figure 10:
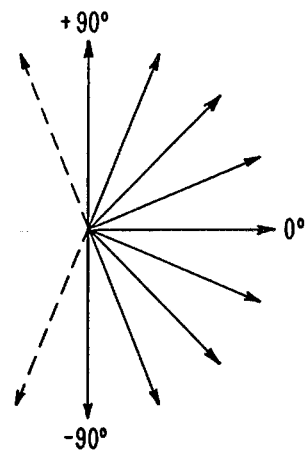
FIG. 10 illustrates a vector diagram to aid in an understanding of the operation of FIG. 9.

Some basic principles are illustrated in FIGS. 9 and 10. In FIG. 9 a single transducer element 46 is illustrated as being divided into a plurality of parts, 9 being shown by way of example. A portion of a wave front 48, shown linear for the small distance involved, will initially impinge upon portion 1 of element 46, then upon portion 2, and then upon the remaining portions, with portion 9 being the last to receive the wave front.

Taking portion 5 of element 46 as a central reference, when wave front 48 impinges upon it, portion 1 will already have experienced the wave and be advanced by some number of degrees or phase angle, herein termed $\alpha$, while at the opposite end of the element portion 9 will be of delayed phase $-\alpha$. The individual portions may be separated and relatively phased to approximate the wave front, however a great savings in equipment costs may be realized by simply choosing an average phase for the entire element, the phase of portion 5, so that only one electrical output connection is required for the whole element. The distance from wave front 48 to dotted line 50 in FIG. 9 thereby represents a phase error and it is seen that portion 5 experiences zero phase error while the phase difference between the end portions relative to portion 5 is $+\alpha$ or $2\alpha$ with respect to one another.

A reasonable output signal will be provided if the value of $\alpha$ is designed to be 90° or less. For example, FIG. 10 illustrates the output signals, in vector form, for the individual portions of element 46 of FIG. 9. The output of portion 5 would be the vector lying at 0°, the output of portion 1 would be the vector lying at $+90°$ and the output of portion 9 would be the vector lying at $-90°$. Intermediate portions have intermediate vectors as illustrated. If all of the vectors are added together a resultant vector quantity is obtained which has a certain magnitude and lies in the same direction as the vector from portion 5, that is at 0°. This is the same effect as electrically tying all of the portions of element 46 together or if element 46 is a single piece of piezoceramic material. If $\alpha$ is made greater than 90°, vectors such as illustrated by the dotted line vectors in FIG. 10 result and would tend to reduce the magnitude of the resultant vector, thereby degrading proper operation.

Figure 11:
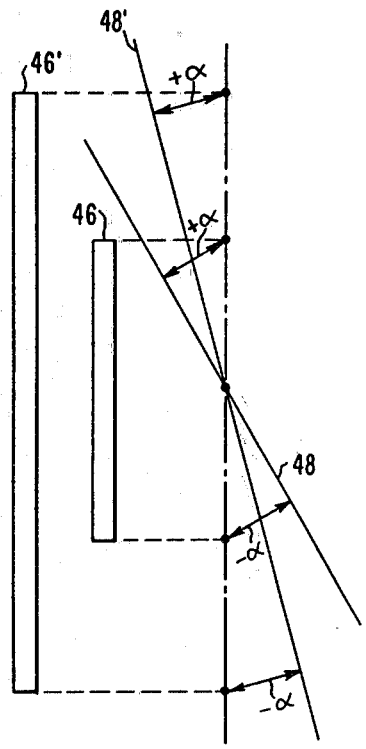
FIG. 11 illustrates two different size transducer active elements in relation to impinging wave fronts.

In the design of the prior art as described in the aformentioned patent, a maximum phase variation from tip to tip of an end transducer element was chosen and the remaining elements of the array had the same length as the end element. In the present invention, rather than making all of the elements the same size as the end element, each element has an individual length so that the magnitude of the phase variation from one end of the element to the other end of the element is twice the chosen $\alpha$. This concept may best be demonstrated with respect to FIG. 11 which illustrates the element 46 and wave front 48 of FIG. 9. FIG. 11 additionally shows the portion of the wave front nearer the center of the array and, for example as seen in FIG. 7, the wave front there is less steep than toward the end of the element array. The wave front portion toward the center of the array has been designated 48' in FIG. 11 and is shown superimposed upon the portion 48. With the dot-dash line representing an average phasing it is seen that an element, designated 46' can be much longer with respect to element 46, yet still meet the criteria of a $+\alpha$ phase variation from end to end.

Figure 12:
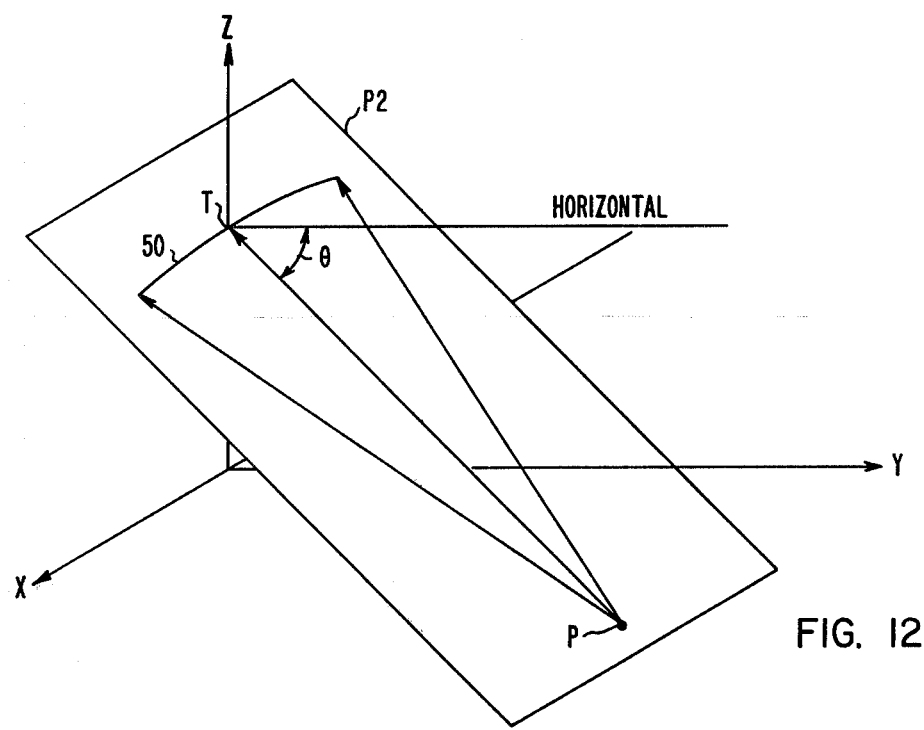
FIG. 12 illustrates, in an XYZ coordinate system the principles of the present invention.

The principles as set forth in FIG. 11 are utilized in the present invention, one embodiment of which is illustrated in FIG. 12, to which reference is now made.

FIG. 12 illustrates an XYZ coordinate system and a plane P2 is positioned at a certain depression angle $\theta$ with respect to horizontal. An arc 50 lies within plane P2 and has its radius center at point P. Axis Z passes through the middle of arc 50 at point T. In the present invention, the transducer active elements are positioned with their faces along arc 50 with the length of the elements being greatest in the middle of the arc and decreasing in length toward the ends thereof. Arc 50 in plane P2 bears some resemblance to arc 30 in plane P1 of FIG. 4 with the distance TP being a radius of curvature of the arc. In FIG. 4 the Y axis constituted a focal line along which all returns were in focus and similarly line 52 in FIG. 13, perpendicular to plane P2 constitutes the focal line of arc 50.

Figure 13:
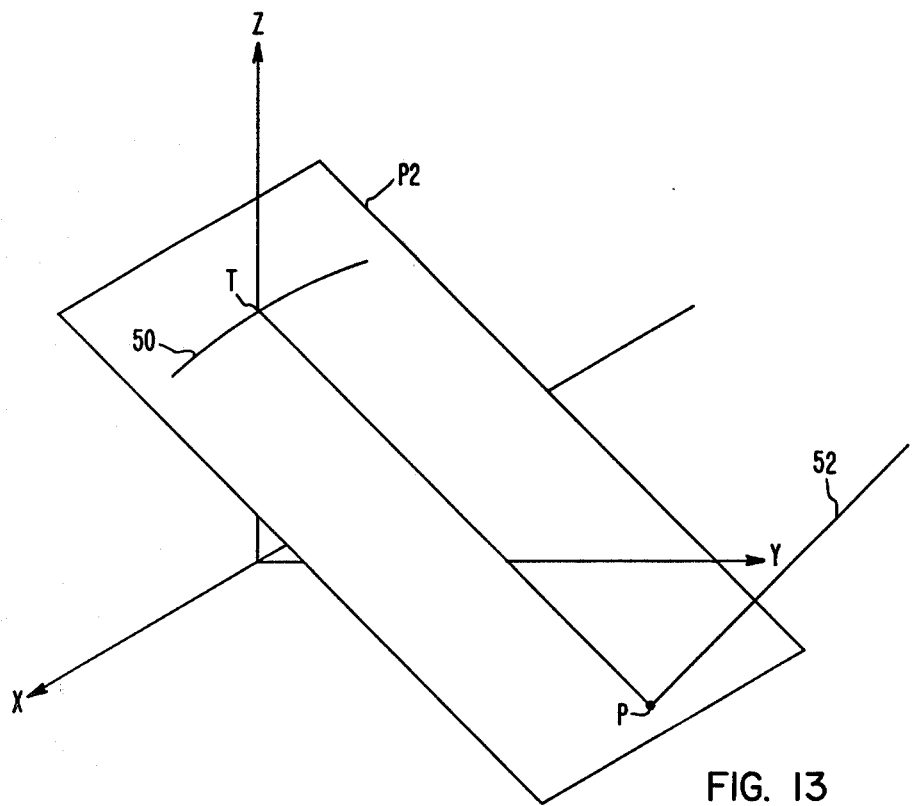
FIG. 13 is similar to FIG. 12 illustrating a focal line for the arc of FIG. 12.
Figure 14:
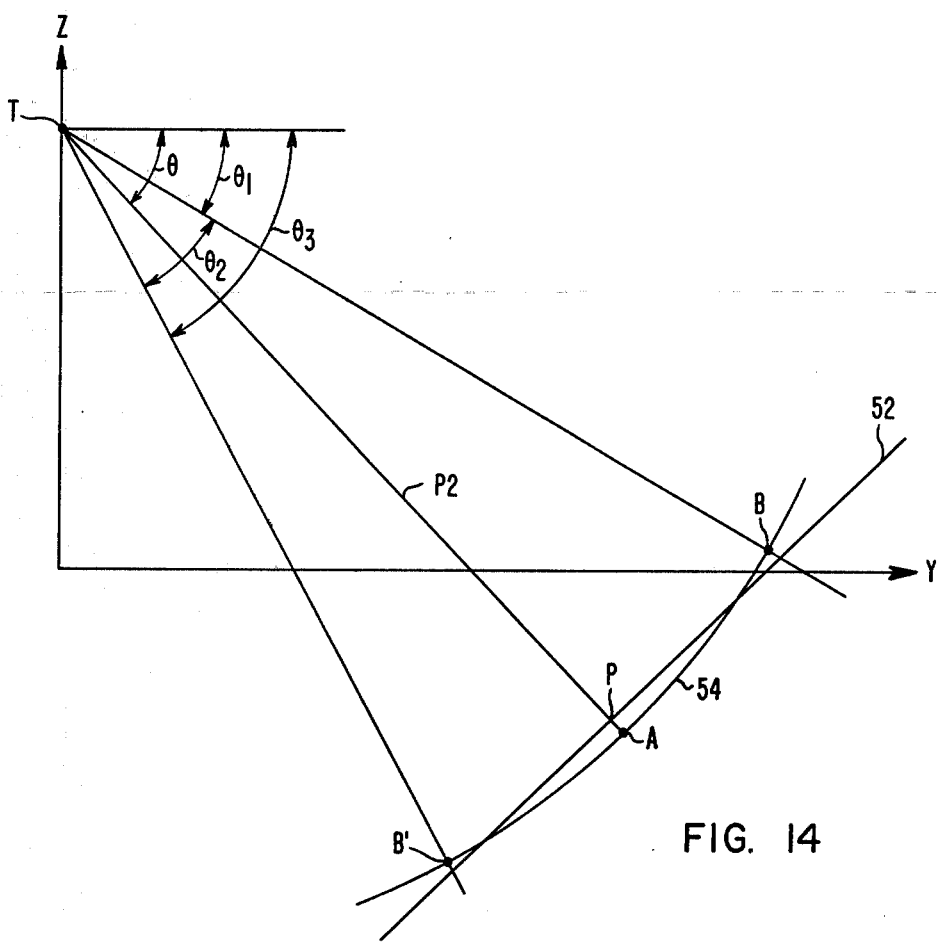
FIG. 14 is a view of the YZ plane of FIG. 12 illustrating certain limits of operation.

FIG. 14 illustrates an elevational view of FIG. 13 looking in along the X axis. With the transducer center at point T and with plane P2 having a depression angle of $\theta$, point P will be in perfect focus (as well as points along the focal line 52). Arc 54 represents an arc drawn with its radius center at point T and energy emanating from any point along that arc 54 will arrive at the transducer at point T at the same time as energy from other points on arc 54. Thus if there is a target at points A, B' and B target reflections from them will all arrive at the same time but since they are not on the focal line 52 they will be slightly out of focus. However, over the total angular distance ($\theta_2$) defined by $\theta_1$ and $\theta_3$ a reasonably good focus is obtained because of only a slight departure from the focal line. If angle $\theta_2$ were made greater, the distance between arc 54 and focal line 52 would be greater and the focus would become less acceptable. Perfectly acceptable results obtain for example when $\theta_2$ is approximately 40°, or less. Accordingly the transmitter apparatus is designed so that an insonifying pulse is confined to a region defined by $\theta_2$.

Figure 15:
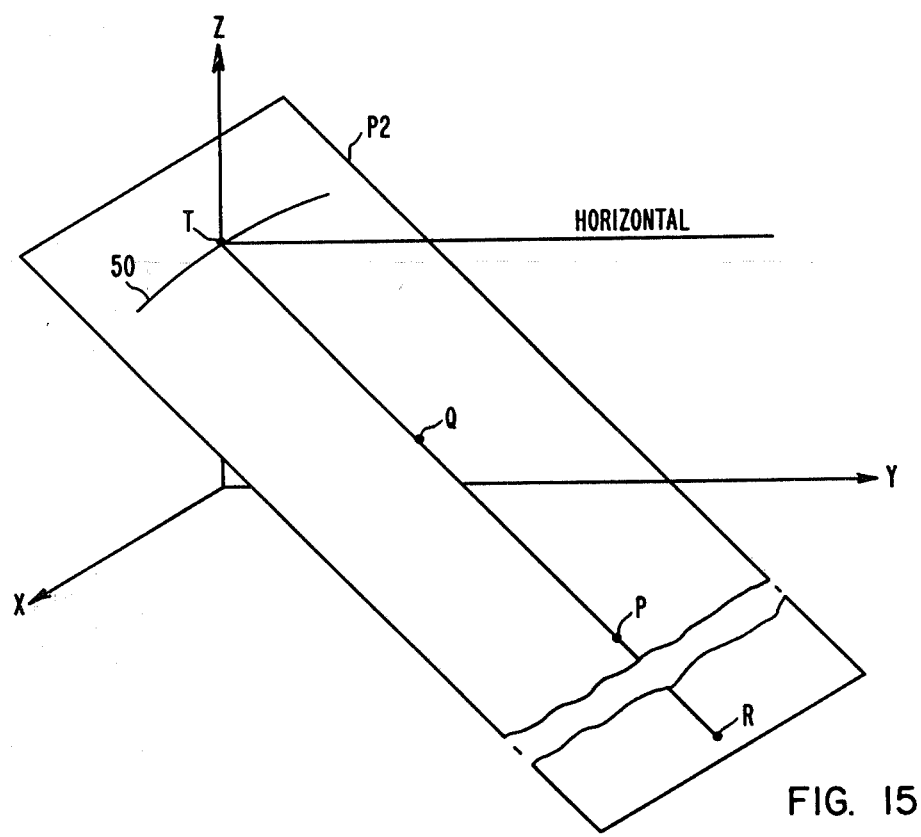
FIG. 15 illustrates the plane of FIG. 12 with several reference points therein.

FIG. 15 reproduces FIG. 12 to illustrate a minimum range point, Q, and a maximum range point, R. Point P is the same, the center point about which arc 50 is drawn. The maximum slant range TR is dependent upon various factors such as the attenuation in the water, the frequency of operation, and the amount of output power of the transmitting transducer. Having thus determined the minimum range TQ and the maximum range TR, point P may be determined so that arc 50 is properly established. This selection process may be demonstrated with reference to FIG. 16 which is a plan view of plane P2 of FIG. 15.

Figure 16:
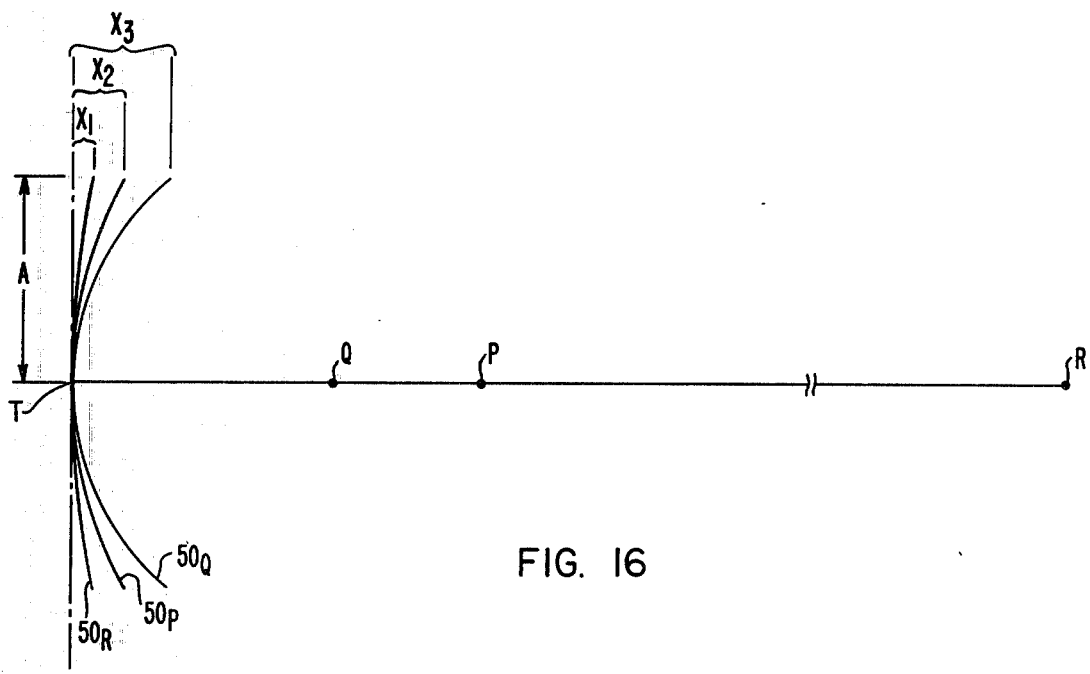
FIG. 16 is a plan view of the plane P2 of FIG. 15 showing impingement of wave fronts from three different ranges.

By way of example let it be assumed that the minimum slant range TQ is 350 feet, the maximum slant range TR is 1400 feet, the length L of the transducer is 30 feet and the wavelength $\lambda$ is $\frac{1}{8}$ inch. Arc $50_Q$ is the arc or wave front of energy emanating from point Q, arc $50_P$ the arc or wave front of energy emanating from point P and arc $50_R$ the arc or wave front of energy emanating from point R. The dot-dash line is a reference line and can be considered the arc or wave front of energy emanating from a point at infinity. It will be appreciated that FIG. 16 is not to scale.

Taking the end of the arc as a maximum phase difference condition, the distance x from the tip or end of an arc to the reference line may be given by the equation:

$$x = \frac{A^2}{2R}$$

where A is the distance from the center of the element array out to a point, x is the distance from that point to the reference line, R is the radius of the arc and the condition is such that $R \gg A$.

In terms of wavelength, the distance A to the end of an arc is 540λ, radius $R_Q$ is 12,600λ, and radius $R_R$ is 50,400λ. By applying the above formula it may be seen that $x_1$ is 2.89λ and $x_3$ is 11.57λ. It would be convenient to design the apparatus such that arc $50_P$ is midway between arcs $50_Q$ and $50_R$ and with this criteria, distance $x_2$ is calculated to be 7.23λ. Knowing this distance, R is calculated to be 20,160λ. That is, the arc upon which the various transducer elements will lie has an arc radius TP of 20,160λ, or 560 feet with the transducer active elements physically lying along arc $50_P$. When the apparatus is focused at point Q an element at the end of arc $50_P$ will, in response to an impinging wave front represented by arc $50_Q$, be out of phase with respect to the center of the transducer array by an amount equivalent to $(11.57λ - 7.23λ) = 4.34λ$. Similarly, from the other extreme, maximum range, the element at the end of arc $50_P$ will in response to a wave front represented by arc $50_R$ be out of phase with respect to an element in the center of the array by $(2.89λ - 7.23λ) = -4.34λ$. Since distance TP is the radius of the arc $50_P$, acoustic energy emanating from point P will be in phase all along the arc.

Figure 17:
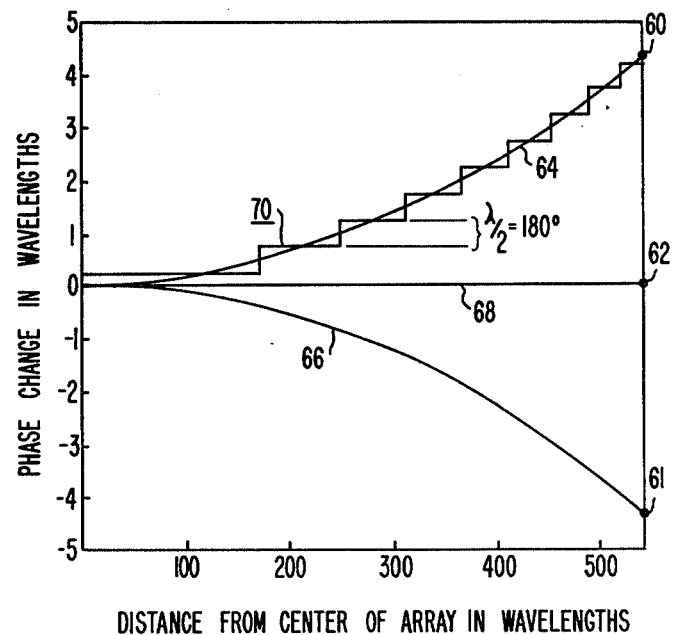
FIG. 17 is a curve to aid in the understanding and design of the apparatus of the present invention.

These relationships are plotted in the curves of FIG. 17 wherein distance from the center of the transducer element array is plotted on the horizontal axis, in wavelengths, and phase change, in wavelengths, is plotted on the vertical axis. Thus, since the distance from the center of the element array to the end is 540 wavelengths, point 60 is plotted as indicating a positive phase change of 4.34 wavelengths. (This is equivalent to distance $x_3 - x_2$ in FIG. 16.) Point 61 represents the condition at the end of the element array for the maximum range case which resulted in a phase change of −4.34 wavelengths (equivalent to distance $x_1 - x_2$). Point 62 represents the condition at the end of the arc for wave energy emanating from point P and therefore resulting in zero phase difference. By varying the value of A from its maximum value to zero value, different values of x may be obtained utilizing the above formula and curve 64 represents the phase difference all along the length of half the transducer for the minimum range case. Curve 66 represents a similar condition for the maximum range case and curve 68 represents the condition for zero phase change at the 560 foot focus. It will be appreciated that the curves illustrated in FIG. 17 are for one-half the array, and the curves for the other half will be a mirror image about the vertical axis.

Superimposed upon curve 64 is a stairstep waveform 70 to illustrate the principles brought out with respect to FIG. 11 regarding the maximum phase difference from one end to the other end of an element being equal for all elements. Let it be assumed that the quantity $|\alpha|$ is equivalent to 90° or λ/4. Thus, the vertical distance between horizontal stairs of the stairstep waveform 70 is equivalent to 180° or λ/2 and curve 64 bisects the vertical portions of stairstep waveform 70. In other words, a horizontal portion can be extended to a point where its distance is λ/4 away from curve 64. At that point the stairstep will rise vertically for a distance of λ/2 (that is, λ/4 away from curve 64 on the other side thereof) and proceed horizontally until it is again λ/4 away from curve 64 where the process is repeated. Stairstep wave form 70 is fitted to curve 64 with these criteria and it is seen that there are 9 horizontal plateaus, this being equivalent to 9 different elements in the distance of 540λ, the first element, equivalent to the first horizontal plateau, being approximately 175λ in length, the second being approximately 72λ in length, with the lengths of the elements thereafter decreasing up until the last element of a length of approximately 20λ. Since FIG. 17 in actuality is only half the array, there would be a total of 17 separate elements, with the central element being 2 times the length of the length of the first plateau of FIG. 17. Although not illustrated, a similar stairstep waveform may be fitted identically to curve 66.

Figure 18:
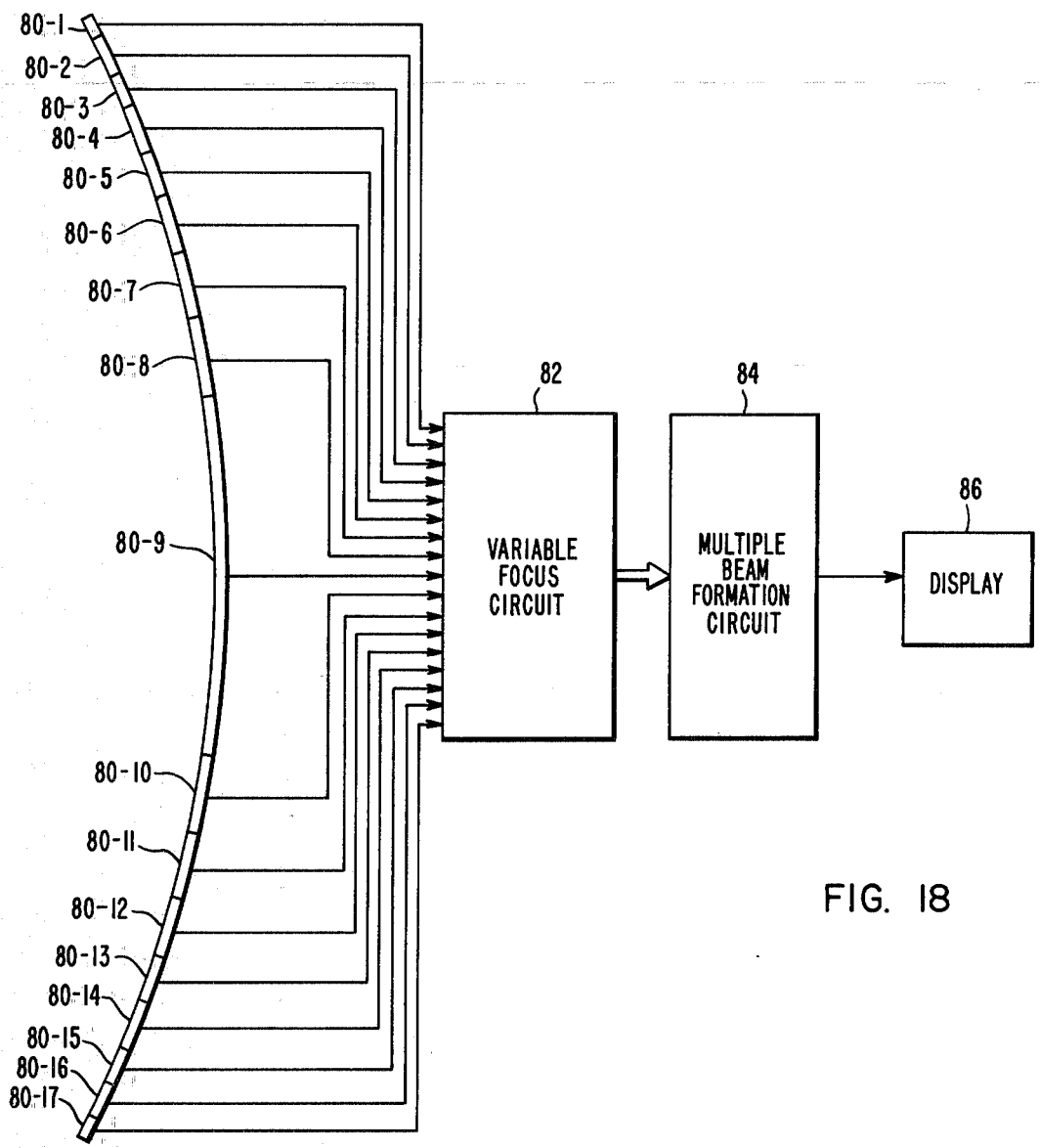
FIG. 18 illustrates one embodiment of the present invention.

An array with the number of elements as determined from FIG. 17 is illustrated in FIG. 18. The active elements designated 80-1 to 80-17 would be positioned along an imaginary arc in a plane having a certain depression angle θ and having a radius of 560 feet in the example given.

The output signals from the respective elements as a result of impingement of reflected acoustic energy are provided to a variable focus circuit 82 where the individual output signals are processed in such a manner as to electronically vary the curvature of the arc to match the wave fronts of energy coming from progressively distant slant ranges. At some time after transmission corresponding to the expected return from a minimum range, there is some phase advance on the end elements with zero phase on the center elements and appropriate phasing in between, thereby causing the apparatus to focus at minimum range in the P2 plane. As time goes on, less and less phase shift is placed on the end elements, and intermediate elements until some intermediate range, which in the present example is at a distance of 560 feet, is reached and at which point no phase difference between elements is experienced. As time progresses further past this intermediate range a delay on the end elements is provided relative to the center of the array and this phasing is varied for focusing out to the maximum range.

Various methods exist for providing this dynamic focusing, among which include acoustic or electromagnetic delay lines or electric or mechanical phase shifters varied as a function of time to provide the desired phase shift. One electronic method utilizing digital techniques is set forth in previously mentioned U.S. Pat. No. 3,950,723 which is herein incorporated by reference.

As previously mentioned a multiple beam capability may be desired in order to increase search rates, such multi-beam formation being described for example in U.S. Pat. No. 3,742,436 which is herein incorporated by reference and U.S. Pat. No. 3,950,723, particularly FIG. 16 thereof. Accordingly in the present apparatus a multiple beam formation circuit 84 is included and which is designed, in conjunction with the variable focus circuit 82 and utilizing the principles taught in said U.S. Pat. No. 3,950,723, to provide the necessary phase shifts to match the desired number of beams with the results of the signal processing thereafter being provided to a display 86.

Referring once again to the transducer element array, for a 30 foot length transducer single beam system, end elements 80-1 and 80-17 would each be 6⅜ inches with the elements progressing in size up to the central element 80-9 which would have a length of 115⅓ inches. Of course if desired some elements may be of shorter length than illustrated and some adjacent elements may even be of the same length, however, this would necessitate an increase in the signal processing channel circuitry of circuits 82 and 84. As a practical matter, the 115⅓ inch central active element 80-9 having the specified curvature would probably not be constituted by a single piezoelectric element. The same is true of other elements of great length. In actual practice the curved elongated elements may be made up of a plurality of short straight line elements arranged end to end to assume the curvature required and for a distance corresponding to the length of a particular element. All of the element segments making up an element would be electrically tied together to simulate the longer element. Accordingly, as used herein the term element may mean a single element which provides an output signal or a plurality of adjacent individual elements electrically tied together to collectively provide an output signal.

Figure 19:
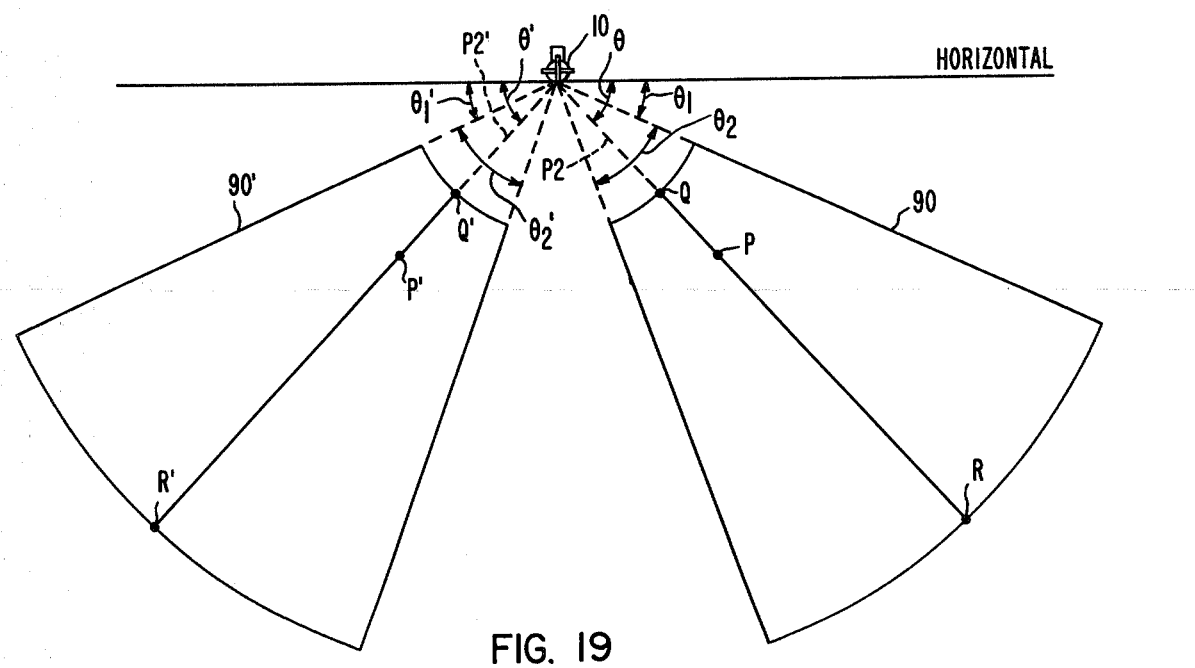
FIG. 19 illustrates the limits of focus of the apparatus of FIG. 18 and FIGS. 19A–C illustrate the operation at three different altitudes above the target area.

FIG. 19 is an elevational view looking at the rear of the carrier vehicle 10. With the transmitter transducer (not shown) and the apparatus for example of FIG. 18 mounted on the carrier vehicle 10, the area of coverage will be that defined by the solid contours 90, for the starboard, and 90' for the port side. Corresponding port angles, ranges, etc. have been given prime reference characters. Plane P2 at a depression angle of $\theta$ with respect to the horizontal is illustrated as well as an area encompassed by angle $\theta_2$ defining the limits of satisfactory operation. For reference, points Q, P and R in the P2 plane are illustrated.

Figure 19A:
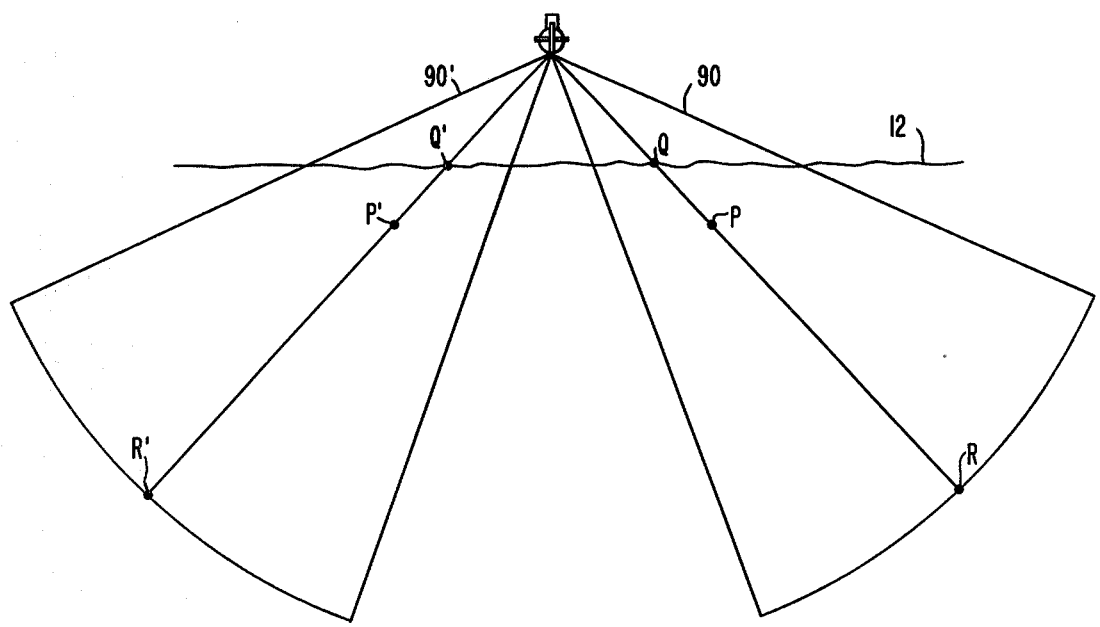
Figure 19B:
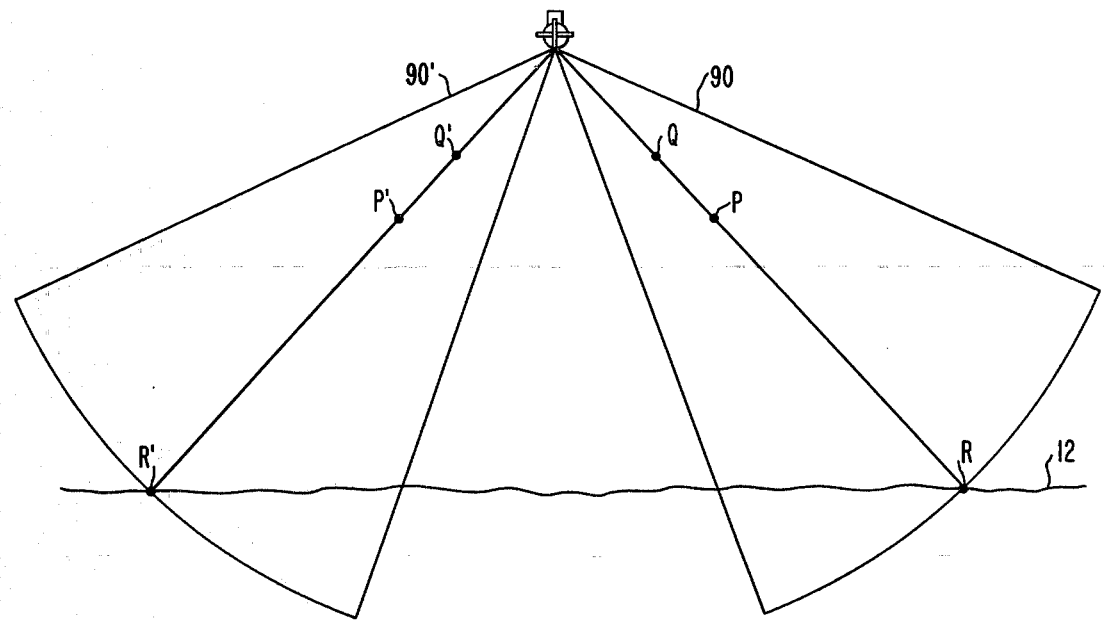
Figure 19C:
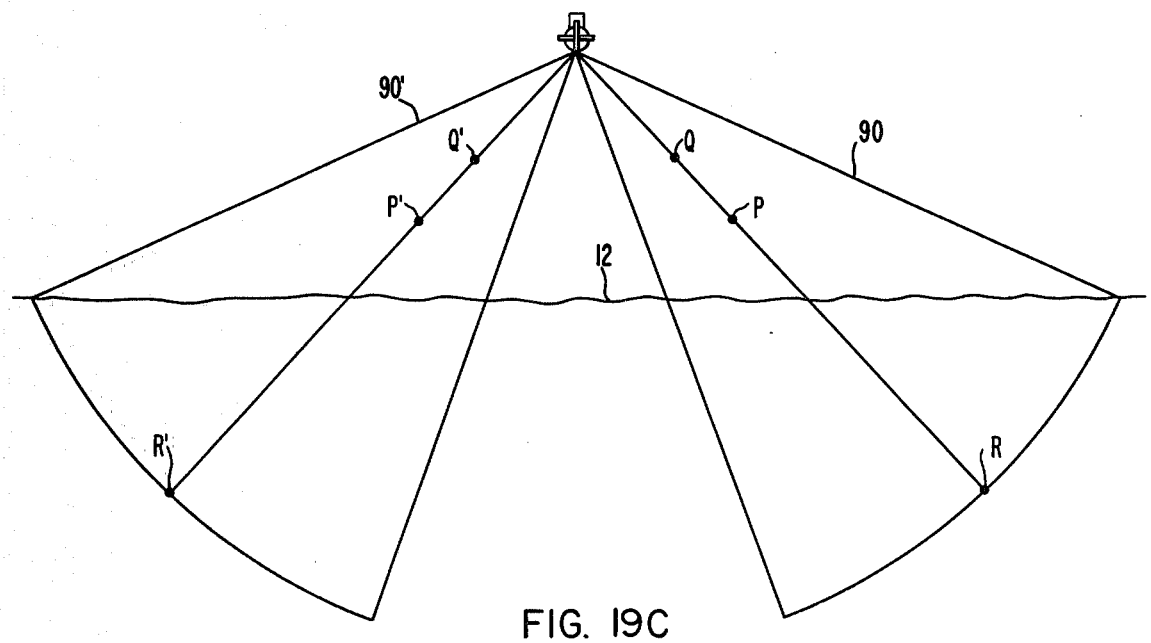

FIG. 19A shows the apparatus at an altitude above the bottom 12 where the slant range is 350 feet, while FIG. 19B illustrates the situation for an altitude wherein the slant range to the bottom 12 is the maximum slant range. FIG. 19C illustrates the greatest lateral coverage, the altitude of the apparatus in such case being $R_{max} \times \cos(90 - \theta_1)$. If such altitude is within the expected range of operation, it may be desired to provide each of the active elements of the transducer with a certain depression angle, as in FIG. 6B, so that maximum energy is directed to the more distant expected returns.

A maximum saving in hardware requirements is obtained by utilizing a transducer whose active elements lie along an arc with the arc being midway between the arcs of the expected wave fronts from minimum and maximum range, as illustrated in FIG. 16. The principles of the present invention, however, are equally applicable to a straight line array which would necessitate the use of more hardware than the curved line array but which would still result in a considerable savings over the prior art apparatus.

Figure 20:
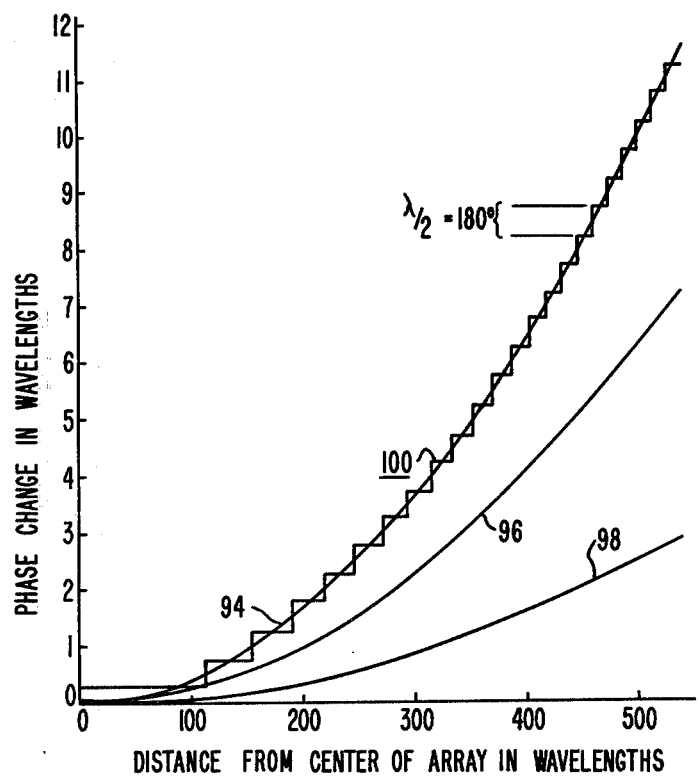
FIG. 20 is a curve as in FIG. 17, however for the design of a straight line transducer array.

The most severe departure from a straight line array would be the wave front $50_Q$ (FIG. 16) from minimum range. If the phase deviations from the middle of the transducer out to one end are plotted, a curve such as curve 94 in FIG. 20 obtains. The phase deviation for the focus at point P is illustrated by curve 96 and that from point R is illustrated by curve 98. Utilizing the same criteria as was utilized with respect to FIG. 17 that each element may deviate from the ideal by $\pm \alpha$ ($\alpha$ by way of example being $\lambda/4$ or 90°, a stairstep waveform 100 is fitted to curve 94 with the height of each stairstep representing $\lambda/2$ or 180° and the horizontal distance along each stair representing the allowable length of a transducer element in the array. From curve 100 it is seen that the longest element (for one-half the array) at the center is approximately 110 wavelengths while the shortest, at the end, is approximately 15 wavelengths. With the present invention therefore only 45 separate elements and signal processing channels would be required as opposed to 72 separate elements and signal processing channels for an array of the prior art.

We claim:
1. Side looking sonar apparatus comprising:
   (A) an elongated side looking sonar receiver transducer having a plurality of active elements lying along an arc;
   (B) said arc lying in a plane having a depression angle $\theta$, with respect to a horizontal line, during operation of said apparatus, $\theta < 90°$.
2. Apparatus according to claim 1 which includes:
   (A) circuit means connected to said elements to electronically vary the focus of said transducer as a function of time.
3. Apparatus according to claim 2 which includes:
   (A) means connected to said elements for forming a plurality of adjacent receiver beams.
4. Side looking sonar apparatus comprising:
   (A) an elongated side looking sonar receiver transducer having an array of adjacent active elements, each having first and second ends, and each lying along a line;
   (B) said transducer being positioned to intercept acoustic energy waves from a minimum range out to a maximum range of an insonified region, during operation of said apparatus;
   (C) an end element of said array experiencing a phase differential of a certain magnitude, from one end of said element to its other, with respect to the phase contour of an impinging acoustic wave front emanating from said minimum range;
   (D) remaining ones of said elements of said array being of respective lengths so as to likewise experience a phase differential from end to end, of said same certain magnitude with respect to said same phase contour of said impinging acoustic wave front.
5. Apparatus according to claim 4 wherein:
   (A) at least one of said elements being made up itself of active elements arranged end to end and electronically tied together.
6. Apparatus according to claim 4 wherein:
   (A) said line is an arc of a circle having a radius of a magnitude greater than the magnitude of said minimum range and less than the magnitude of said maximum range.
7. Apparatus according to claim 4 wherein:
   (A) said certain magnitude of phase differential is 180°.

* * * * *